(No Model.)

J. L. STURGIS & J. T. TAYLOR.
RIDING HARROW.

No. 588,192. Patented Aug. 17, 1897.

WITNESSES
J. Frank Culverwell,
A. M. Poynter

INVENTORS
James L. Sturgis,
James T. Taylor.
By John Hedderburn
Attorney.

UNITED STATES PATENT OFFICE.

JAMES L. STURGIS AND JAMES T. TAYLOR, OF MONROE CITY, MISSOURI.

RIDING-HARROW.

SPECIFICATION forming part of Letters Patent No. 588,192, dated August 17, 1897.

Application filed February 18, 1897. Serial No. 624,063. (No model.)

*To all whom it may concern:*

Be it known that we, JAMES L. STURGIS and JAMES T. TAYLOR, citizens of the United States, residing at Monroe City, in the county of Monroe and State of Missouri, have invented certain new and useful Improvements in Riding-Harrows; and we do hereby declare the following to be a full, clear, and exact description of the invention, such as will enable others skilled in the art to which it appertains to make and use the same.

This invention relates to improvements in harrows, and has more particular relation to harrows adapted to be raised or lowered at will, so that they may be adjusted to an operative position or elevated so that they may be carried from place to place without injury to the harrow-teeth.

The invention consists of certain novel constructions, combinations, and arrangements of parts, all of which will be hereinafter more particularly set forth and claimed.

Figure 1:
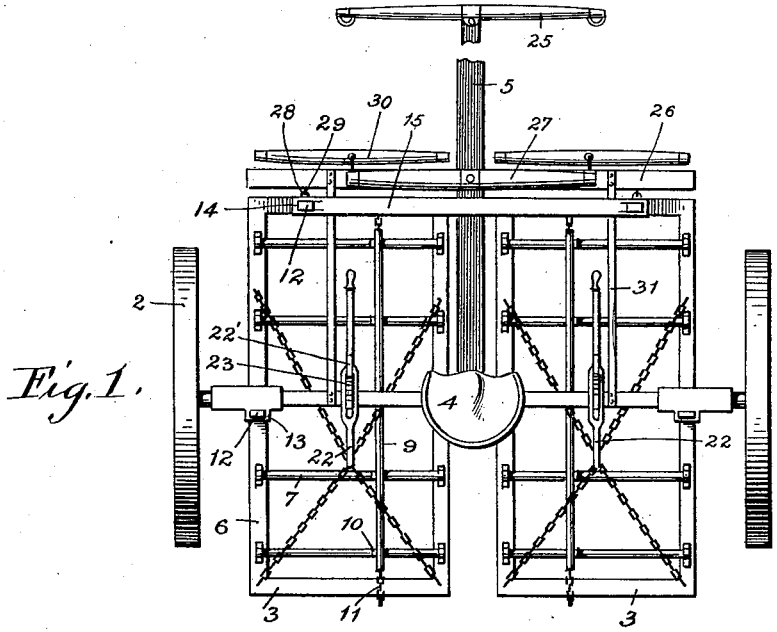
Figure 2:
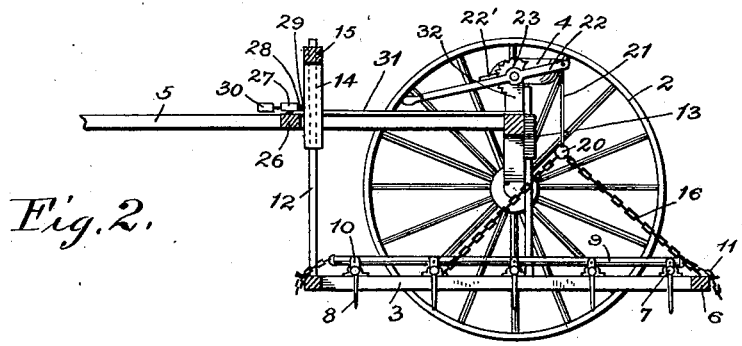
Figure 3:
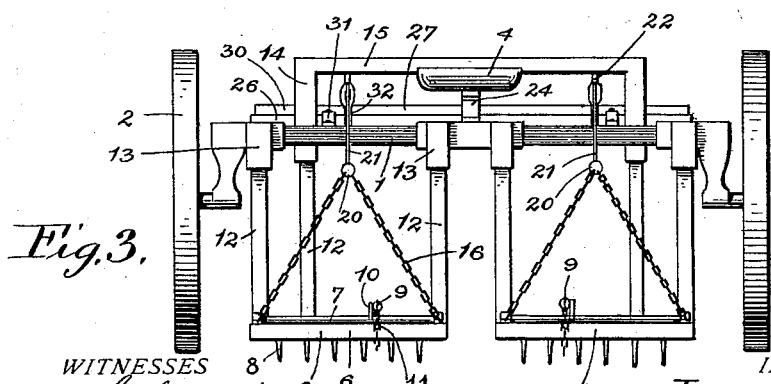

In the accompanying drawings, forming part of this specification, Figure 1 represents a plan view of a harrow embodying our invention, the frames being in their lowered positions. Fig. 2 represents a vertical transverse section of the same with the frames in their elevated positions, and Fig. 3 represents a rear view.

1 in the drawings represents the axle or main frame; 2, the wheels journaled thereon; 3 3, the harrow-frames; 4, the driver's seat, and 5 the draft-tongue.

The axle 1 is preferably provided with a crank-bend at each end, so as to raise the same some distance above the centers of the wheels 2 to permit the desired vertical movement of the harrow-frames under the axle. Each of said frames 3 comprises a frame proper, 6, and a plurality of spaced bars 7, journaled therein so that they may be rocked back and forth at will. Each of these bars 7 is provided with a plurality of spaced pendent harrow-teeth 8. The inclinations of these teeth are changed at will by connecting rods or levers 9, mounted above each of the frames 6 and pivotally connected to vertical arms 10, rigidly secured to said bars.

It will be observed from the foregoing that when the bars 9 are moved longitudinally the bars 10, carrying the harrow-teeth, will be oscillated, thus changing the inclination of the harrow-teeth to the desired degree. The bars 9 are secured in their adjusted positions in any desirable manner, but preferably by linked chains 11, as shown, connected thereto and adapted to hook over suitable pins mounted on the frames 6. Each of said frames 6 is supported in position by three vertical standards 12 12 12, rigidly secured thereto at its sides and front. The two side standards 12 pass upward through suitable slotted castings 13, rigidly secured to the axle 1 and adapted to guide said standards in their movements. The forward standards 12 pass upward through similar guide-castings 14, secured to the opposite ends of a cross-bar 15, which is secured to the draft-tongue 5, the rear end of the latter being in turn secured in position upon the axle 1. Each of said frames 6 is provided with a plurality of chains 16, connected to its opposite sides and to a central ring 20. This ring is connected to a pendent rod or chain 21, the upper end of which is pivotally mounted upon a lever 22, pivoted upon the frame 32 and provided with a spring-pressed pawl 22', which engages a segmental rack-plate 23, also mounted upon said axle 1.

It will be observed from the foregoing that by operating the levers 22 the harrow-frames 3 may be raised and lowered at will to the desired degree or entirely raised to clear the ground to permit the harrow to be moved from place to place without injury to the teeth. The driver's seat 4 is mounted upon the axle 1 by a suitable casting 24. The forward end of the tongue 5 is provided with a neck-yoke 25, to which the draft-animals are secured when hitched to the machine.

A cross-bar 26, upon which is mounted a doubletree 27, has its opposite ends provided with hooks 28, adapted to hook over suitable rings 29, formed on the castings 14. Each end of said doubletree 27 is provided with a singletree 30, adapted for the attachment of the draft-animals. The cross-bar 26 is further braced in position by bars 31, connected thereto near its outer ends and also connected to the said axle 1.

It will be observed from the foregoing description that with our improved machine the harrow-teeth may be simultaneously tipped to any desired degree to cause them to enter the soil to a greater or less depth, according to the character of work to be accomplished.

It will further be observed that by the peculiar construction of the harrow-frames and their sliding standards and levers the said frames may be instantly raised or lowered, as desired, to put the machine into operative position or to permit of its being rolled from place to place without injury to the teeth.

Having thus described our invention, what we claim as new, and desire to secure by Letters Patent, is—

1. In a harrow, the combination with a main frame, of a harrow-frame, a plurality of guiding-castings mounted on the main frame, a plurality of standards mounted on the harrow-frame and adapted to slide in said castings whereby the harrow-frame is guided vertically, and an adjusting-lever mounted on the main frame and connected to the harrow-frame for raising and lowering the same, substantially as described.

2. In a harrow, the combination with an arched axle carrying a wheel at each end, of a plurality of harrow-frames carrying harrow-teeth, sliding standards mounted on said frames, slotted castings mounted on the axle to receive a portion of said standards, a draft-tongue secured to said axle, a cross-bar mounted on said draft-tongue, slotted castings secured to said cross-bar and adapted to receive the remainder of said sliding standards, and means for raising and lowering the harrow-frames at will, substantially as described.

3. The combination with a plurality of harrow-frames, of an arched axle provided with a wheel at each end, sliding standards connecting said axle and said frames, a tongue connected to said axle, a cross-bar mounted on said tongue, guiding-castings mounted on said cross-bar, sliding standards mounted in said castings and connected to the harrow-frames, another cross-bar connected to said castings, rods connecting said latter cross-bar to the axle, and a doubletree mounted on this latter cross-bar, substantially as described.

In testimony whereof we have signed this specification in the presence of two subscribing witnesses.

JAMES L. STURGIS.
JAMES T. TAYLOR.

Witnesses:
EDMUND P. MELSON,
CHAS. P. McCARTY.